Feb. 11, 1969  J. P. FAUST, SR  3,426,625
ROUND HOODED CHAIN SAW SHARPENER
Filed April 13, 1966

United States Patent Office 3,426,625
Patented Feb. 11, 1969

3,426,625
ROUND HOODED CHAIN SAW SHARPENER
Joseph P. Faust, Sr., P.O. Box 321,
Woodville, Miss. 39669
Filed Apr. 13, 1966, Ser. No. 547,070
U.S. Cl. 76—37
Int. Cl. B23d 63/10, 63/16

5 Claims

ABSTRACT OF THE DISCLOSURE

A chain saw sharpened in the form of pliers which is clamped onto a cutter tooth of the saw and while the tooth is so held a file is rotated in a depth gauge channel rack mounted on jaws of the pliers to remove metal from the tooth and sharpen it.

---

Figure 1:
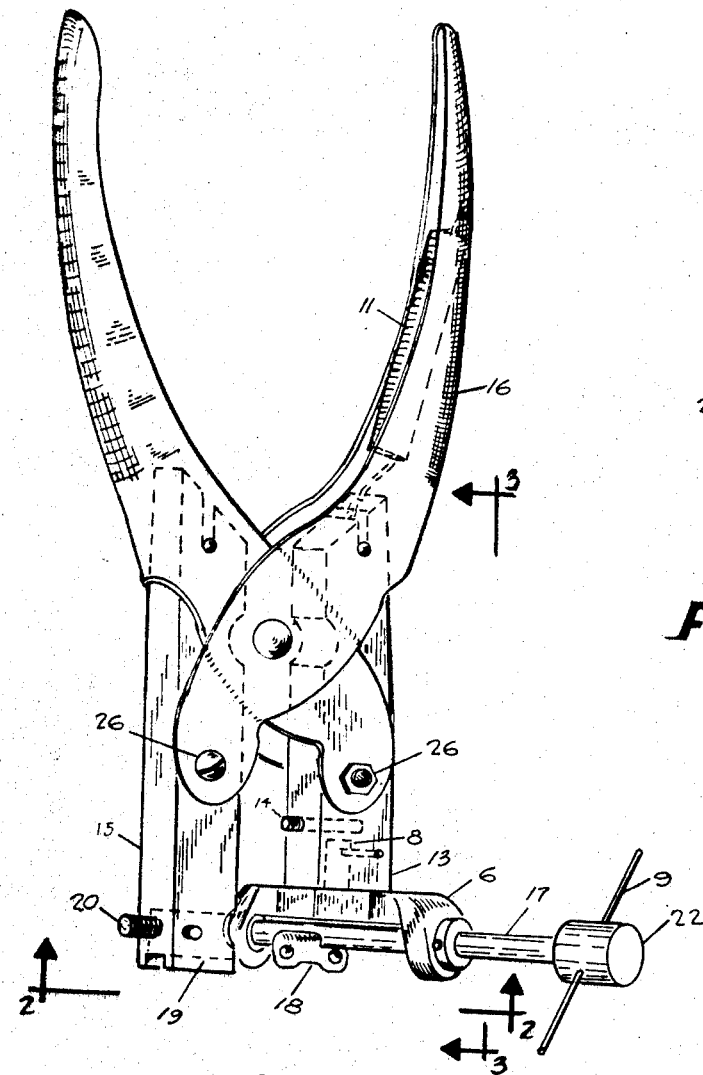

The invention herein should and shall be referred to as a round-hooded chain saw sharpener, for chain saws used for the cutting of wood, timber, etc. It is to be manufactured from malleable and tool steel and is nickel or chrome plated. The tool is manufactured with steel machine tools, either by hand or mechanically. The tool is extremely accurate. Each chain saw cutter tooth sharpened with this tool will have the exact amount of steel removed from it each time it is sharpened; the tooth will be sharpened evenly and smoothly. The sharpener requires no special cutting tool, using standard round chain saw files in a rotary fashion as illustrated in drawing instead of backward and forward as chain saws are normally being filed by hand. The sharpener can be operated with files of different dimensions, from 3/16" to 5/16", depending on chain size and saw capacity, however the sharpener described in this application applies only to the small dimensions, from 3/16" to 1/4" size files. File bushing sizes vary according to the size file being used.

The sharpener is a form of plier which is clamped on to the cutter tooth with the proper size file clamped into the cutter edge, the reverse plier jaw carries the cutter tooth chamber that presses the cutter tooth to the file the exact amount permitted by the gauge and then, after pressure is applied manually, the thumb screw file handle is turned in a clock-wise direction, thus cutting away steel from the cutter tooth and bringing the cutter tooth to a sharp edge. The depth gauge channel guides and supports the cutter gauge in the file rack and maintains the proper depth to allow proper clearance for depth gauge—from .025" to .050"—which variation in clearance is necessary because of texture of wood to be cut; the softer the wood the more clearance can be allowed. Variation can be governed by regulating, by hand filing, and removing from the depth gauge the necessary amount of metal, by the following method: Use a straight edge that would reach, lying flat, from one cutter tooth to another cutter tooth with a thickness gauge slipped under said straight edge on top of the depth gauge; this will determine the exact clearance necessary and whether the depth should be lowered or left intact.

This tool will sharpen a cutter chain either on or removed from the cutter bar. The versatility of the sharpener makes it possible for it to be used by both right and left handed persons. Each and every tooth can be filed with an accurate set either at 22½° angle or 45° angle. To change from right to left hand requires only changing the file handle to the reverse side from which it would be used by a right-handed person. Teeth can be sharpened in any position on the cutter bar and the sharpener can be alternated from right to left immediately from one tooth to another. The tool will enable the owner of a power saw to get perfect performance in cutting operations at the same time conserving the chain, cutter bar, and motor which will prolong the life of the saw, in general, at least 100 percent.

Detailed description of the several views of the drawing

Figure 2:
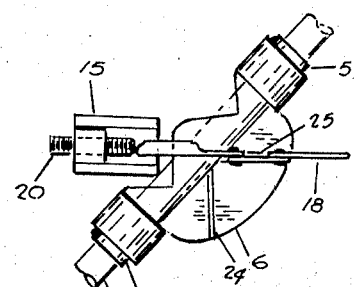
Figure 3:
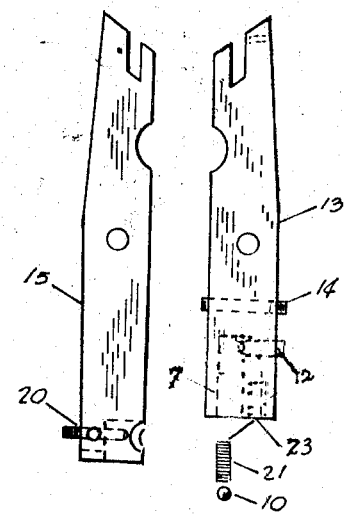

FIGURE 1 is a perspective view of the assembled saw sharpener; FIGURE 2 is a top view of the file and depth gauge channel rack; and FIGURE 3 is a side elevation of the tool jaws.

The plier handles to which the following invention, round hooded chain saw sharpener, are attached are an equal-pressure type, meaning that the jaws meet equally and smoothly from top to bottom when the tool is closed. I claim no rights or title to the equal-pressure plier portion per se of this tool.

Dimensions of the tool jaws: One jaw 15 is 3/8" thick, 5/8" wide, and 3⅞" in length; the other jaw 13 has the same thickness and width dimensions as jaw 15 and is 3 5/16" in length. The tool jaws have two ¼" by 1½" springs 11, pull-type, enclosed in the handles to keep the tool jaws open. Plier handles 15 and 16 closed are 5½" in length. Jaw opening with plier fully opened is ½". 19 (being in the tool jaw 15) is the cutter tooth and adjustment chamber cut in the top of the jaw and is 3/16" wide, ¼" deep, and 3/8" long, starting 1/16" below the top surface of tool jaw and serves to support the round hooded cutter tooth and adjusts same as the tooth wears. 6 is the file and depth gauge channel rack. Plier handles are bolted to tool jaws by two 3/16" x 11/16" screw head bolts, N.C., 26.

Tool jaws 13 and 15 have been described above. 12 is a set-screw channel carrying an 9/32" x 3/8" standard socket head set screw with cup point, N.C. threads, to lock dial stud pin. 20 is a 10/32 x 5/8" standard socket head set screw with cup point, N.F. threads. 21 is a 3/16" by 5/16" coil spring with brass seat in top. 10 is 5/32" ball bearing to lock swing of file and depth gauge channel rack, described more fully below is a vertical channel, ¼" in diameter by ¾" in depth to support stud pin 8, see FIGURES 1 and 3. 23 is a 3/16" x 5/16" vertical channel to support spring and brass seat support 21. 14 is a 10/32" x 5/8" standard socket head set screw with cup point, N.F. threads, for adjusting or gauging amount to be removed from cutter tooth, with a 9/32" x 3/16" socket head set to lock same after being set in position.

FIGURE 2 shows the relative positions of a file and depth-gauge channel rack 6, a file bushing 5, a file 17, and a portion of a round hooded chain saw during the sharpening operation.

5 is a file bushing and bearing to be supported by the file and depth gauge channel rack 6, as illustrated. Dimensions of the bushings vary—three different sizes being used with 3/16", 7/32", and ¼" bore. The 3/8" outside bearing is supported by file and depth gauge channel rack 6. Standard chain saw file 17 can be 3/16" to 9/16" in diameter. 24 are left-hand cutter depth guide channels, 9/32" in width by 5/32" in depth, and ½" in length; the cutter guide channel is 22½° from center of file rack pin and the other channel slot is 45° from the same center point and has the same length, depth and width as mentioned above. 25 are right hand cutter depth guide channels with the same dimensions and same degree angles from the file rack pin center as 24. 8 is the file rack and depth gauge channel stud pin, ¼" x 13/16" with 7/32" threads. The file rack and depth gauge channel swings 45° from both sides to permit insertion of both right and left round hooded teeth for sharpening. 9 are two thumb screws, ¼" x ¾", with round steel plugs 1/16" thick welded on for tightening on to files for rotating. 22 is a 5/8" in diameter outside steel tube, 5/8" in length with ¼" bore, tapped in two exact opposite positions and threaded to take ¼" thumb screws for the purpose of rotating the file for sharpening the cutter tooth. 6 is the file and depth gauge channel rack, inside diameter between bushing openings is 1¼" and the base of the bushing opening is ½" and the overall length is 1¾" and the overall depth is ⅞"; it has a 7/32" thickness on the inside and the outside is ½" in thickness and the height of the bushing hole flanges are ⅝". The two 90° cutouts for 45° swing are ⅜" x ½". The file and depth gauge channel rack pivots from right to left and vice versa at a 45° angle.

The advantages of the above described chain saw sharpener are:

(1) Uses regular or standard round chain saw files,
(2) Can be filed on or off cutter bar,
(3) Can be used by right and left hand,
(4) Can file cutter at any position on cutter bar,
(5) Can alternate from right to left instantly,
(6) Can use any size chain saw file, 3/16" to 9/16",
(7) File can be moved ¼" in either direction for new cutting surface. 100% more service rendered than ordinary hand filing methods would produce with perfect accuracy,
(8) Tool has springs to retain open position so as not to need both hands for application. Blind persons can be taught very easily to operate.

I claim:
1. A chain saw sharpener comprising a pair of pliers-type handles pivoted intermediate their ends, jaw means attached to each of said handles, means on one of said jaws for supporting the back portion of a cutter tooth of said chain saw, and a file and depth gauge channel rack rotatably mounted on the other of said jaws, said file and depth gauge rack including a file supporting and guiding means and cutter guide channel means for supporting and guiding a forward portion of said cutter tooth during the sharpening operation.

2. A chain saw sharpener as defined in claim 1 including means mounted on one of said jaws for varying the distance between the jaws when they are in the closed position, whereby the amount of metal to be removed from a tooth can be varied.

3. A chain saw sharpener as defined in claim 1 in which the cutter guide channel means includes a plurality of radial guide channels, whereby each tooth can be given a set of any angle from 22½ to 45°.

4. A chain saw sharpener as defined in claim 1 including detent means for holding the file and depth gauge channel rack stationary relative to its supporting jaw during the sharpening operation.

5. A chain saw sharpener as defined in claim 1 including spring means mounted on said handles to normally bias said jaws to open position.

References Cited
UNITED STATES PATENTS

| | | | |
|---|---|---|---|
| 713,423 | 11/1902 | Gaede | 76—78 |
| 2,701,975 | 2/1955 | Evanoff | 76—37 |
| 2,770,985 | 11/1956 | Pearce | 76—31 |
| 2,815,686 | 12/1957 | Harrison et al. | 76—37 |

TRAVIS S. McGEHEE, *Primary Examiner.*

U.S. Cl. X.R.

76—31, 78